(12) United States Patent
Marr et al.

(10) Patent No.: US 9,348,391 B1
(45) Date of Patent: May 24, 2016

(54) MANAGING RESOURCE POWER STATES IN SHARED ENVIRONMENTS

(75) Inventors: Michael David Marr, Monroe, WA (US); Matthew D. Klein, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 605 days.

(21) Appl. No.: 13/536,482

(22) Filed: Jun. 28, 2012

(51) Int. Cl.
*G06F 1/32* (2006.01)
*G06F 9/50* (2006.01)

(52) U.S. Cl.
CPC ............ *G06F 1/3203* (2013.01); *G06F 9/5072* (2013.01)

(58) Field of Classification Search
CPC .............................. G06F 1/3203; G06F 9/5072
USPC .......................................................... 713/321
See application file for complete search history.

(56) References Cited

U.S. PATENT DOCUMENTS

| | | | | |
|---|---|---|---|---|
| 6,631,309 | B2 * | 10/2003 | Boies et al. ................... | 700/291 |
| 6,738,412 | B1 * | 5/2004 | Hayakawa ..................... | 375/130 |
| 6,785,592 | B1 * | 8/2004 | Smith et al. ................... | 700/291 |
| 7,039,699 | B1 * | 5/2006 | Narin et al. ................... | 709/224 |
| 7,412,492 | B1 * | 8/2008 | Waldspurger ................. | 709/216 |
| 8,037,329 | B2 * | 10/2011 | Leech et al. ................... | 713/320 |
| 8,140,873 | B2 * | 3/2012 | Hamilton et al. ............. | 713/320 |
| 8,397,087 | B1 * | 3/2013 | Gardner et al. ............... | 713/300 |
| 8,521,476 | B2 * | 8/2013 | Tung et al. ..................... | 702/188 |
| 8,533,103 | B1 * | 9/2013 | Certain et al. ................. | 705/37 |
| 8,681,622 | B2 * | 3/2014 | Chatterjee et al. ............ | 370/232 |
| 8,700,929 | B1 * | 4/2014 | Weber et al. .................. | 713/310 |
| 2002/0010690 | A1 * | 1/2002 | Howell et al. ................. | 705/412 |
| 2005/0102393 | A1 * | 5/2005 | Murray et al. ................. | 709/224 |
| 2005/0210498 | A1 * | 9/2005 | Scott et al. ..................... | 725/8 |
| 2006/0190605 | A1 * | 8/2006 | Franz et al. .................... | 709/226 |
| 2007/0049133 | A1 * | 3/2007 | Conroy et al. ................. | 439/894 |
| 2007/0130481 | A1 * | 6/2007 | Takahashi et al. ............ | 713/300 |
| 2007/0260896 | A1 * | 11/2007 | Brundridge et al. .......... | 713/300 |
| 2007/0283354 | A1 | 12/2007 | Kelly et al. | |
| 2007/0294557 | A1 * | 12/2007 | Dubinsky ....................... | 713/324 |
| 2008/0126547 | A1 * | 5/2008 | Waldspurger ................. | 709/226 |
| 2008/0162956 | A1 * | 7/2008 | Bozek ................... | G06F 1/3209 713/310 |
| 2008/0184230 | A1 * | 7/2008 | Leech et al. ................... | 718/100 |

(Continued)

OTHER PUBLICATIONS

USPTO Non-Final Office Action dated Jun. 4, 2014 for U.S. Appl. No. 13/536,509, 36 pages.

(Continued)

*Primary Examiner* — Thomas Lee
*Assistant Examiner* — Santosh R Poudel
(74) *Attorney, Agent, or Firm* — Hogan Lovells US LLP

(57) ABSTRACT

Customers in a multi-tenant environment can obtain power consumption information for a set of resources or other computing components used by those customers, including time-accurate accounting for various components of those resources utilized on behalf of the customer. A customer can also have the ability to specify how the resources are to be operated when used for the customer, in order to manage the amount of power consumption. The accounting can be performed even when the resources are shared among multiple users or entities. Various hardware components or agents can be used to provide detailed power consumption information for those components that is associated with a particular customer. The information can be used not only for accounting and monitoring purposes, but also to make dynamic adjustments based on various changes in usage, power consumption, or other such factors.

28 Claims, 5 Drawing Sheets

(56) References Cited

U.S. PATENT DOCUMENTS

| | | | |
|---|---|---|---|
| 2008/0301473 A1* | 12/2008 | Perez et al. | 713/300 |
| 2009/0044036 A1* | 2/2009 | Merkin | 713/340 |
| 2009/0113039 A1* | 4/2009 | Savoor et al. | 709/224 |
| 2009/0164356 A1* | 6/2009 | Bakman | 705/34 |
| 2009/0187776 A1* | 7/2009 | Baba et al. | 713/320 |
| 2009/0198385 A1* | 8/2009 | Oe et al. | 700/296 |
| 2009/0253405 A1* | 10/2009 | Yang | 455/406 |
| 2009/0300152 A1* | 12/2009 | Ferris | 709/223 |
| 2009/0327775 A1* | 12/2009 | Hamilton et al. | 713/320 |
| 2010/0027552 A1* | 2/2010 | Hill | 370/401 |
| 2010/0031259 A1* | 2/2010 | Inoue | 718/1 |
| 2010/0057529 A1* | 3/2010 | Boss et al. | 705/10 |
| 2010/0058079 A1* | 3/2010 | Yamamoto et al. | 713/300 |
| 2010/0098013 A1* | 4/2010 | Jorguseski et al. | 370/329 |
| 2010/0106436 A1* | 4/2010 | Ichinomiya et al. | 702/61 |
| 2010/0114932 A1* | 5/2010 | Whitcher et al. | 707/760 |
| 2010/0169352 A1* | 7/2010 | Flowers et al. | 707/759 |
| 2010/0205469 A1* | 8/2010 | McCarthy et al. | 713/324 |
| 2010/0217865 A1* | 8/2010 | Ferris | 709/226 |
| 2010/0250440 A1* | 9/2010 | Wang et al. | 705/63 |
| 2010/0268930 A1* | 10/2010 | Bose et al. | 713/100 |
| 2010/0305891 A1* | 12/2010 | Rodgers | 702/62 |
| 2010/0332373 A1 | 12/2010 | Crabtree et al. | |
| 2011/0022870 A1* | 1/2011 | McGrane et al. | 713/340 |
| 2011/0055605 A1* | 3/2011 | Jackson | 713/320 |
| 2011/0060927 A1* | 3/2011 | Fillingim et al. | 713/320 |
| 2011/0072293 A1* | 3/2011 | Mazzaferri et al. | 713/340 |
| 2011/0109472 A1* | 5/2011 | Spirakis et al. | 340/870.02 |
| 2011/0161696 A1* | 6/2011 | Fletcher | 713/320 |
| 2011/0188457 A1* | 8/2011 | Shu et al. | 370/329 |
| 2011/0213686 A1* | 9/2011 | Ferris et al. | 705/34 |
| 2011/0213997 A1* | 9/2011 | Kansal et al. | 713/324 |
| 2011/0296019 A1* | 12/2011 | Ferris et al. | 709/226 |
| 2011/0313902 A1* | 12/2011 | Liu et al. | 705/34 |
| 2012/0011378 A1* | 1/2012 | Dalton et al. | 713/300 |
| 2012/0016721 A1* | 1/2012 | Weinman | 705/7.35 |
| 2012/0023351 A1* | 1/2012 | Wakrat et al. | 713/322 |
| 2012/0054514 A1* | 3/2012 | Barsness et al. | 713/320 |
| 2012/0089263 A1* | 4/2012 | Park et al. | 700/291 |
| 2012/0102351 A1* | 4/2012 | Tomi | 713/340 |
| 2012/0117403 A1* | 5/2012 | Bieswanger et al. | 713/322 |
| 2012/0124402 A1* | 5/2012 | Vanderwiel | 713/320 |
| 2012/0290865 A1* | 11/2012 | Kansal et al. | 713/340 |
| 2012/0296737 A1 | 11/2012 | Wolff | |
| 2012/0316695 A1* | 12/2012 | Chen et al. | 700/296 |
| 2012/0324072 A1* | 12/2012 | Sartini | G06F 9/50 709/223 |
| 2012/0330711 A1* | 12/2012 | Jain et al. | 705/7.23 |
| 2013/0024477 A1* | 1/2013 | Chodavarapu et al. | 707/784 |
| 2013/0060933 A1* | 3/2013 | Tung et al. | 709/224 |
| 2013/0132944 A1* | 5/2013 | Davis | 718/1 |
| 2013/0208955 A1* | 8/2013 | Zhao et al. | 382/128 |

OTHER PUBLICATIONS

USPTO Final Office Action dated Jan. 5, 2015 for U.S. Appl. No. 13/536,509, 24 pages.

USPTO Non-Final Office Action dated Apr. 10, 2015 for U.S. Appl. No. 13/536,509, 16 pages.

* cited by examiner

MANAGING RESOURCE POWER STATES IN SHARED ENVIRONMENTS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, a user would like to know how much power is consumed through usage of these resources. For many hardware devices, however, it can be difficult to obtain an accurate accounting of power consumption. Further, there might be multiple users or entities sharing a resource, and it can be difficult to accurately apportion the power consumption among the users based on their relative usage. Further still, a user has very little control over the power states or operational states of these resources and components, which can be frustrating or at least inconvenient for a user, particularly where there are regulations on power consumption or the user gets credits for reducing consumption.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing shared, single-tenant, and/or multi-tenant resources in an electronic environment. In particular, various embodiments monitor the power consumption of various resources and/or computing components that is attributable to usage of a particular customer. The power consumption information can be provided to the customer such that the customer can make adjustments in usage, if desired, to reduce the amount of consumption, purchase environmental credits for the amount of consumption, or perform another such task, workload, etc. At least some embodiments provide services wherein a customer can request certain power profiles or power options, whereby a provider of the resources can adjust the resources allocated to that customer according to the request. In at least some embodiments, control over the power states of various components can be exposed to the customer, whereby the customer can make at least some adjustments to the operational state and/or power state of one or more components in order to manage the amount of power consumption. In some embodiments a system or service can also monitor the various ramp up, ramp down, provisioning, and other portions of a process that can also be attributed to a customer, can determine an appropriate power consumption for each, and can determine an appropriate amount of power consumption to allocate to the customer.

Many other alternatives and variations are described and suggested below in relation to at least some of the various embodiments.

Figure 1:
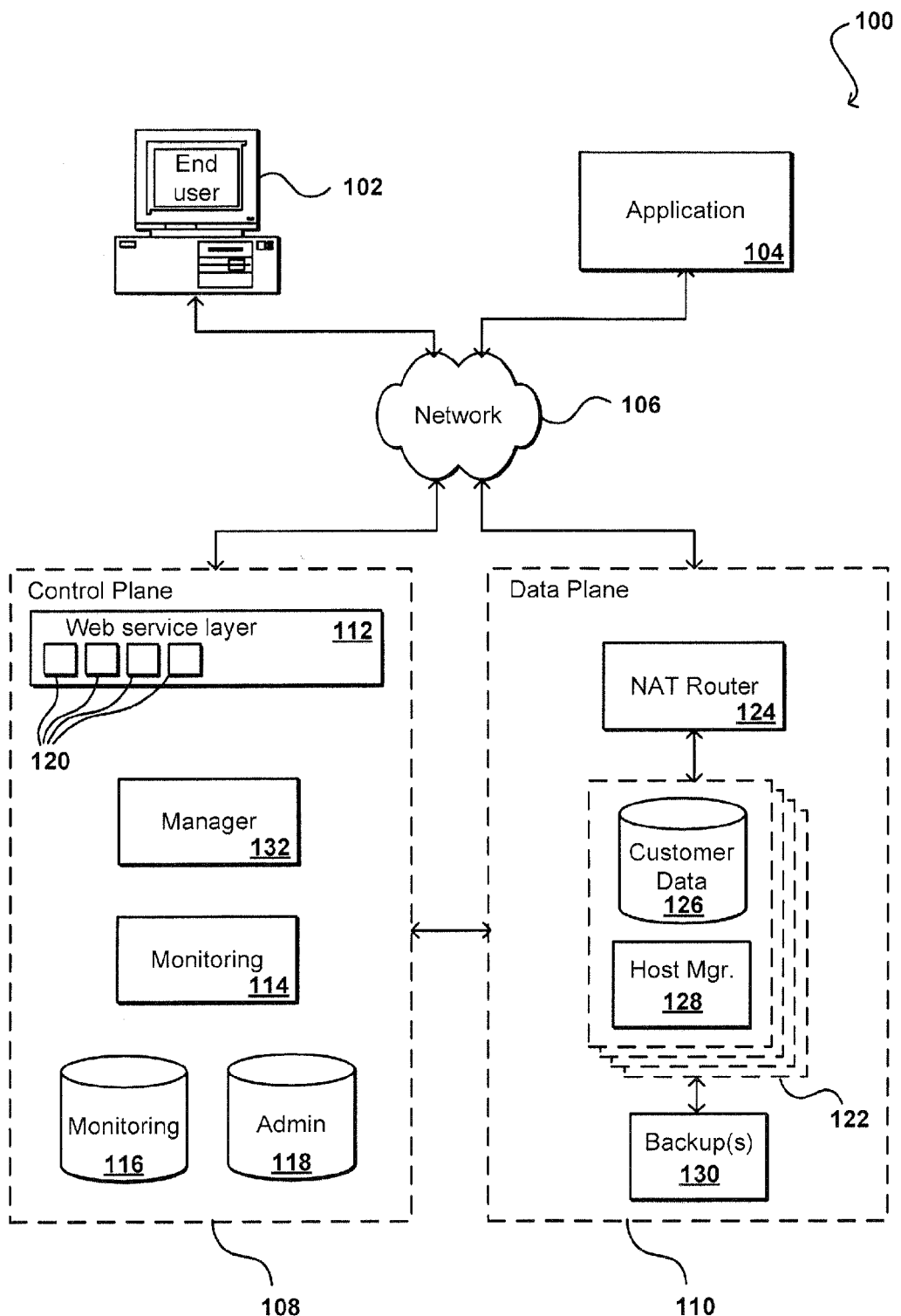
FIG. 1 illustrates an environment for providing access to various resources that can be used in accordance with various embodiments.

Systems and methods in accordance with various embodiments provide at least one resource access gateway, or control plane 108, either as part of a data environment or in a path between an end user device 102 and a data plane 110, as illustrated in the example environment 100 of FIG. 1. A control plane can enable users and applications to access shared and/or dedicated resources, offered by one or more resource providers, while allowing customers, administrators, or other authorized users to allocate at least some of these resources to various users, clients, or applications and ensure adherence to those allocations. A user then can perform tasks such as storing, processing, and querying relational data sets in a "cloud" of these resources. Guest users can also obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared and/or dedicated access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

In the example of FIG. 1, a computing device 102 for an end user is shown to be able to make calls through at least one appropriate network 106, such as the Internet or a cellular network, for example, to a control plane 108 (or other such access layer) to perform a task such as to obtain access to a specified resource or resource type. While an end user computing device 102 and a third party application 104 are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request to establish a connection to a data repository to execute a query for a user. In this example, the Web services layer can parse the request to determine the type of connection or access needed, the appropriate type(s) of resource needed, or other such aspects.

The control plane can include one or more resource allocation managers 132, or "cloud managers," each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane 110, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a domain name, IP address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port number to be used to access a resource. A user then can access the resource directly using the IP address and port, without having to access or go through the control plane 108.

The control plane 108 in this embodiment also includes at least one monitoring component 114. When a data instance or other resource is allocated, created, or otherwise made available in the data plane, information for the resource can be written to a data store accessible to the control plane, such as a monitoring data store 116. It should be understood that the monitoring data store can be a separate data store or a portion of another data store. A monitoring component 114 can access the information in the monitoring data store 116 to determine information such as the past usage of resources by various users, a current number or type of hardware threads or other computing resources being allocated to a user, and other such usage information. A monitoring component also can call into components of the data environment to determine information such as the number of active network connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 118, which can store information such as the general allocation granted to a user, throttling or limiting information for a user, resource permissions for a user, or any other such information that can be specified and/or updated by an administrator or other such user.

In at least some embodiments, physical resources such as host servers can support one or more customer instances, which might each include a guest operating system (OS) and software that are to be executed on the host device. In an example where users request connections to various data instances, each instance 122 in the data environment can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 132 can communicate periodically with each host manager 128 for which a connection has been established, or to an administration server or other component of the resource environment, to determine status information such as load, utilization levels of various resources, capacity, etc.

As discussed, once a resource is provisioned and a user is provided with an IP address derived from DNS mappings or other address or location, the user can communicate "directly" with components or resources of the data plane 110. An IP address derived from DNS mappings is beneficial in such a dynamic cloud environment, as instance or availability failures, for example, can be masked by programmatically remapping the IP address to any appropriate replacement instance for a use. Other dynamic mappings of addresses to physical substrate servers are possible, for example with the use of network address translation (NAT) or overlay networks. A request received from a user device 102 or application 104, for example, can be directed to a NAT router 124, or other appropriate component, which can direct the request to the actual resource 122 or host corresponding to the mapped address of the request. Such an approach allows for instances to be dynamically moved, updated, replicated, etc., without requiring the user or application to change the IP address or other address used to access the instance. In some cases, a resource 122 such as a data instance can have at least one backup instance 130, copy in persistent storage, etc.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. This native-level access to remote hardware can be provided for resources such as servers, hosts, and cluster instances, for example. For resources such as cluster instances, customers may have native access to a sub-set of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and simpler guest instance images can be used, as guests do not need a multitude of hardware-specific drivers.

Resource providers can, in at least some embodiments, provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine running an OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some embodiments, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

Figure 2:
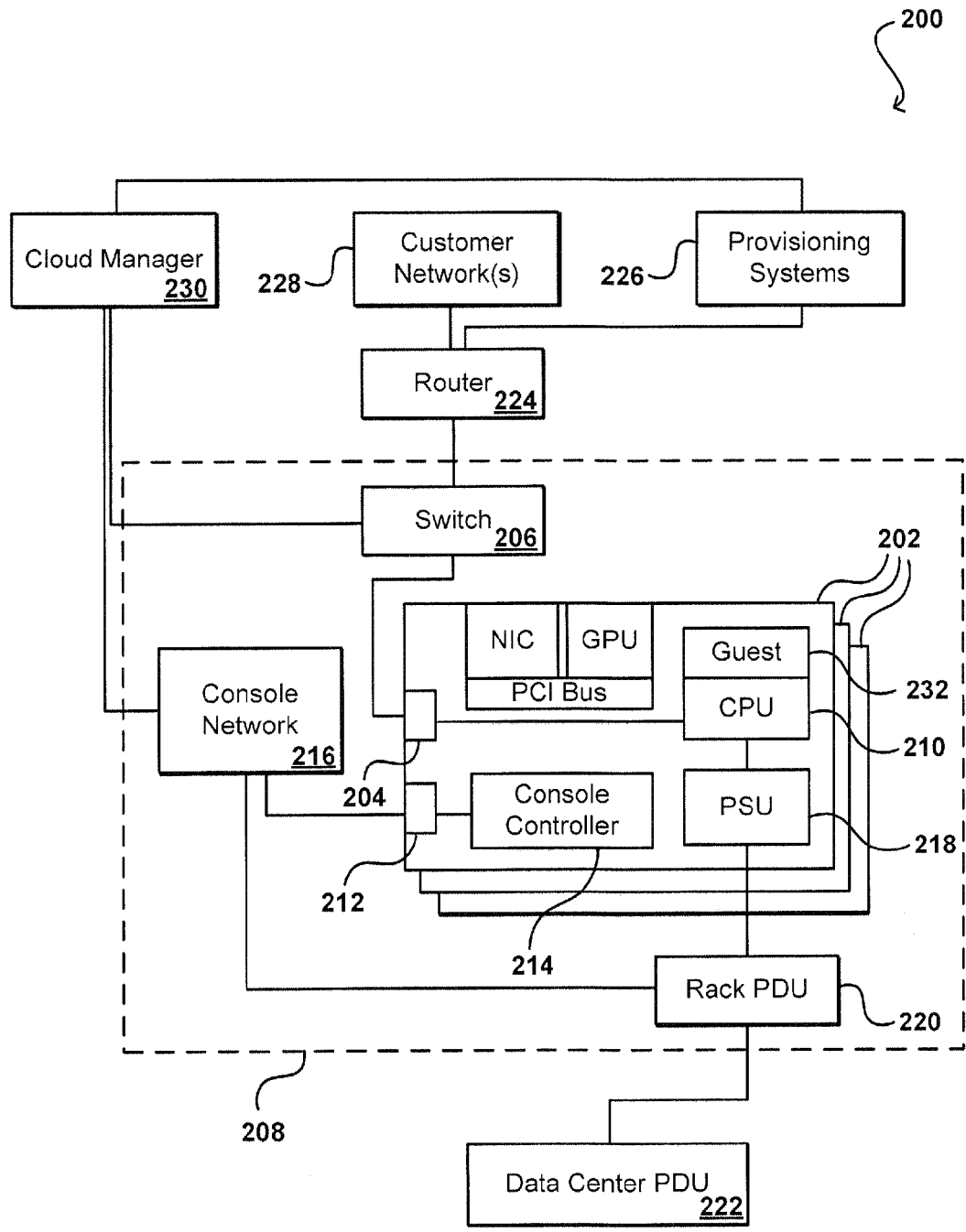
FIG. 2 illustrates a configuration for providing access to specific hardware resources that can be used in accordance with various embodiments.

FIG. 2 illustrates an example of a configuration 200 that can be used to provide a customer with access to at least part of a set of resources 202 in accordance with one embodiment. The access can be full access, or at least partial access, to the underlying hardware, or can be restructured only to access to a virtual host or instance, with limited if any access to the supporting hardware. Various other types of access can be provided as well within the scope of the various embodiments. This example will be discussed with respect to granting a user access to a host machine using conventional PCI-based technology, but it should be understood that this is merely an example and that approaches within the scope of the various embodiments can be used with any appropriate hardware, software, and protocols currently used or subsequently developed for such purposes.

This example configuration 200 includes a set of host devices 202, such as servers or similar devices, that each can have a series of network ports 204. Some of these ports can function as "production" ports which connect each host to at least one "smart" network switch 206 capable of processing and routing network traffic to/from each host device 202. In a data center example, there might be one smart switch for each rack of servers 208, for example. At least one of these network ports 204 can be used by a guest operating system 232 for a host, where the guest is effectively operating "on top of" at least one central processing unit (CPU) 210 in the allocated or partitioned host device (e.g., server) 202 that has access to this production network port. The host device 202 also can have at least one console port 212 and a console controller 214, which can connect to a separate console network 216. In some embodiments, at least some of these ports can be merged but logically separated (e.g., muxed on the same physical port). Each host device also can have one or more dedicated power supply units (PSUs) 218, which can be accessed by the console controller 214 and/or the main CPU 210, whereby the machine can be powered off, or have a power level adjusted, via either the host CPU or a device on the network, for example. The power supply for every server in a rack can be connected to a rack power distribution unit (PDU) 220, which can be connected by a higher power cable to one or more data center PDUs 222, each of which can support multiple rack PDUs. In some cases, the hosts 202 can be powered on and off directly using a "smart" rack PDU 220 connected to the console network 216 or similar control network with relays or other such components to power cycle each device without requiring cooperation from the console controller 214. Similarly, multiple host devices 202 may share a single PSU 218, which likewise may provide power control to these individual host devices and which is directly managed by the console network 216 or similar network (not depicted in FIG. 2).

At least one router 224 can connect the host devices 202 to one or more provisioning systems 226, and the switch and/or router can manage access to these provisioning systems. In some embodiments a capability such as a preboot execution environment (PXE) exists on a host machine 202. Power can be cycled using the console (or other power control mechanism previously described). As the machine boots, the PXE firmware can execute additional stages of boot software delivered from the network port 204. The PXE environment can download a management operating system to the machine, for example into a RAM (random access memory) disk or other block of storage, to enables control operations such as firmware flashing or provisioning of a new customer image. Provisioning images thus can be received, over the network to the PXE environment, which contain firmware flashing tools or other provisioning code. Once provisioning is completed, authorized customer networks 228 can interact with the devices 202 via the switch 206. The provisioning and control systems can control the switch in real time with no humans involved, as the automatic switching of that path can be based on provisioning events and external coordination, for example. The coordination can be provided and/or managed by an external system, such as a cloud manager system 230 or service, or other such control plane or control system as discussed elsewhere herein, which can instruct the provisioning system(s) 226, console network 216, and host machines 202 or other such resources to perform certain actions. The cloud manager 230 can include one or more workflow systems that work with a central database, in one embodiment, to perform various aspects of resource management.

As mentioned, customers provisioned on these host machines 202 might be interested in information about the amount of power consumed by these resources, or "computing components," particularly as are attributable to customer actions. For example, a customer might work for a "green" company that attempts to offset any environmental impact of that company's actions. In some instances, a customer might be in an area where there are regulations regarding power consumption. In other cases, there might be incentives for customers who reduce their power consumption. Further still, there might be customers who prefer to have a more accurate accounting of the costs for their usage of various resources, particularly where there are excess costs for certain levels of power usage. Various other reasons for wanting more granular power information and/or control can exist as well in other situations.

Accordingly, systems and methods in accordance with various embodiments can attempt to monitor and accurately determine information regarding power consumption for various resources and/or computing components that can be attributed to specific customers. Systems and methods in accordance with various embodiments can also enable a customer to manage various power states, operational modes, or other aspects of those resources or computing components in order to control the amount of power consumption that is attributable to that customer. As referred to herein, computing components can refer to components such as, for example, processors (e.g., CPUs), memory, network interface cards, storage devices, graphics processors, and other PCI devices that can be used to perform and/or assist in the performance of a computing operation as discussed and suggested herein.

Figure 3:
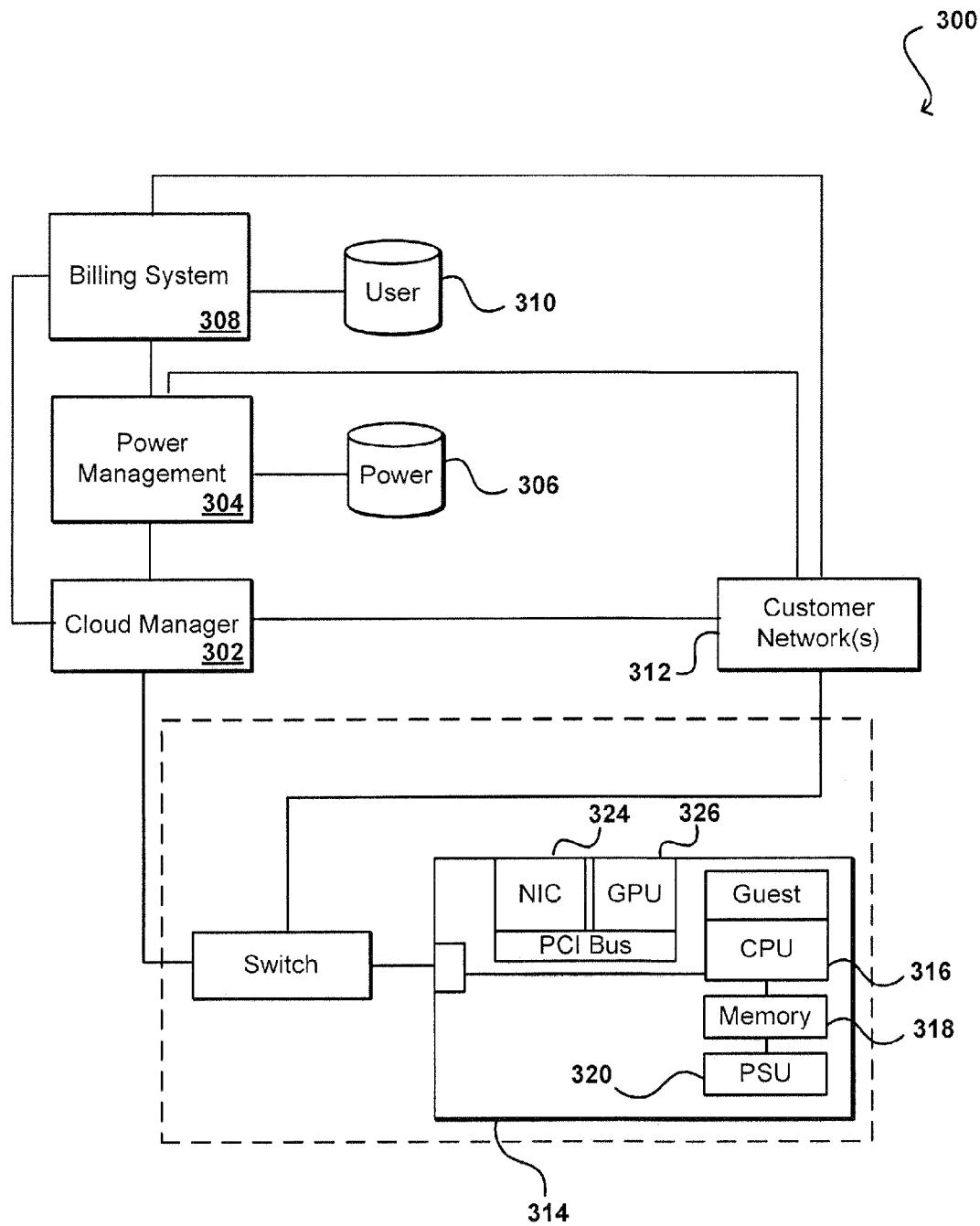
FIG. 3 illustrates a configuration for managing power state information for a one or more components of a provisioned host machine that can be used in accordance with various embodiments.

FIG. 3 illustrates an example environment 300 wherein a customer is provisioned on a single host machine 314 of a multi-tenant environment in accordance with various embodiments. It should be understood that the customer can be provisioned on multiple resources of one or more types, and that the example of a single host is provided for simplicity of explanation. There also can be additional customers, users, applications, or other such entities provisioned on, or having access to, that host device as well in various embodiments. In some embodiments, the user might have dedicated and/or full access to the host device 314 for at least a period of time. Various other types of access can be provided as well within the scope of the various embodiments.

In this example, a cloud manager 302 or other such component can manage the provisioning of a customer instance, associated with one or more customer networks 312, on the host machine 314, as well as the access to various components of the host machine. These components can include, for example, at least one CPU 316, a portion of memory 318, and one or more peripheral devices, such as a network interface card (NIC) 324 or a graphics processing unit (GPU) 326. For customer instances, a guest operating system 322 can be executed using at least one of the allocated CPUs. A power management service 304, which can be separate from, or a part of, the cloud manager 302, can be in communication with any or all of these components, in order to determine a current power state, operational state, power consumption rate, or other such information that can be used to determine an amount of power consumption for each of these components over a period of time. The power information can be stored to a power data store 306 or other such location for subsequent retrieval. A customer can send a request, such as a Web service request, to an API or other interface of the power management service 304. The power management service can utilize information about the amount of power consumption of the various components, as well as information about the periods of time in which various components were being used for activities related to the customer, to determine an amount of power consumption attributable to the customer. The power management service can then send a response to the customer network 312 regarding the amount of power consumption. The same, or similar, data can also be provided to a billing system 308, which can store the data to a user data store 310 or other such location for use in determining appropriate billing for the customer, as may be based at least in part upon the determined amount of power consumption. The billing might not only take into account the type of resources used and the amount of time each resource was used by a customer, but might also take into account the power state, operational state, or other such aspect of the resource during the access. In at least some embodiments, a customer might get a lower rate for using resources in lower power consumption states, or lower power states.

In at least some embodiments, a customer can access information from the power management service, such as by logging into a power console, sending an API request, etc. The power management service can provide information such as the amount of power consumption attributable to the customer, the amount of that power consumption that is attributable to each type of resource or component used, the operational or power state of those resources or components at different times of usage, and other such information. The power management service can also, where information about the power sources and other related information is available, provide information about a carbon footprint or other amount of environmental impact attributable to that amount of power consumption. In at least some embodiments, the service might also enable the customer to purchase environmental credits to offset at least a portion of the environmental impact.

A power management service 304 in accordance with various embodiments can also enable a customer to provide input regarding an amount of power consumption to be used for that customer going forward, at least for a specified period of time. The customer can be provided with a variety of different power consumption options, the selection of which might be based at least in part upon a type of customer, a level of access, a type of resource, or other such information. In some embodiments, a customer might be able to specify a maximum "instantaneous" power level, which indicates the maximum amount of power that can be used for processes attributed to that customer at any time. A customer in some embodiments can also, or alternatively, specify a maximum amount of power to be used over a determined or specified period of time, such that the customer can control power usage but allow for power usage spikes when needed. The rate a customer is charged can be affected by the type and/or amount of limits that are applied.

In a first example, a customer might be able to specify one or more classifications of performance. For example, a customer might be able to specify that the customer wants to optimize for "performance" or optimize for "power." A customer indicating a desire to optimize for performance can cause a component such as a cloud manager or power management service to set one or more components or resources to a state of optimal performance while that resource or component is allocated to the user. For example, a CPU can be set to run at a highest speed, all memory available to the customer can be active, disks allocated to the customer can be spun up, etc. Further, any resource or component might be set to a highest operational state or power state, as may vary by component. A customer can select to optimize for other parameters as well, such as throughput and latency, among others.

Alternatively, if the customer indicates that the customer wants to optimize for power, a power management service or other such entity can attempt to reduce the amount of power consumption to the extent possible while still meeting one or more performance metrics or other such criteria. For example, the power state of a CPU can be adjusted for any customer instances in order to reduce power consumption per unit time. Similarly, a power management service can analyze information such as past customer usage or performance to estimate an amount of memory, disk space, bandwidth, or other such metric that the customer will likely require, and can hot swap or power down various components, such as RAM or processors. The power management service can also spin down one or more drives in order to conserve power when those drives are not in use. Various peripheral devices can be adjusted as well, such as to put a NIC in a low power state, run a CPU or GPU or SSD in a low power mode, etc. The service can look at the expected needs to support the customer usage, as well as any service or performance guarantees or criteria, and can determine an appropriate adjustment to be made to minimize power consumption for that user. In at least some embodiments, the power management service can also monitor incoming requests for that customer and/or usage by that customer and adjust power consumption levels accordingly. For example, if a customer needs more capacity to perform one or more tasks the power management service might increase a power state of a component. If the customer usage is less than expected, the service can reduce the power states of one or more components. In cases where there is a transition period to go between states, the service can also factor in the transition period power consumption, as discussed elsewhere herein.

In other embodiments, a customer might be able to request specific actions to be taken in order to reduce power consumption. For example, a customer might be able to provide more granular requests than "optimize for power," for example, such as "use minimum memory," "perform minimal caching," "operate in lowest possible CPU power state," or "spin down drives when not used in the last minute." In some cases, a user might even be able to request certain power states. For example, a user can specify an idle state (e.g., a "c-state") wherein the clock frequency and therefore idle power of the CPU may be reduced. Increasing the number of functional units that are stopped by cutting the clock will reduce the power consumption (although additional time and power will be required to wake up CPU resources and/or increase the idle state of the device). As an example of idle states, c-states for conventional devices typically run from C0, where the CPU is fully operational at a highest clock speed, to C6, which is a deep power down state. C-state values in-between correspond to different circuits and/or signals being available. A customer also can specify a preferred or target operational state (e.g., a p-state as used for certain voltage and/or frequency operating points for various processors) wherein the CPU can be running with different power profiles, but the CPU can be capable of doing useful work in any p-state. Reducing an operating frequency and/or voltage can cause the device to enter a higher p-state. Reducing the clock frequency will reduce the operational speed of the processor, which also reduces energy consumption rate. Reducing the voltage decreases the leakage current from the transistors of the processor, making the processor more energy efficient. Voltage can often be lowered with frequency, and the effects on power consumption are complementary. A balance can be struck between reducing the rate of power consumption and slowing down the processor such that instructions take longer to process. A power management component then can attempt to meet the customer requests when possible, or at least come as close as is practical based on any of a number of different factors, such as host machine load, number of customers sharing a resource, etc.

In other embodiments, such as where a customer has substantially dedicated, full or "bare metal" access to one or more resources and/or components in a multi-tenant environment, the power management service can actually turn over at least a portion of the power state control to the customer. For example, the power management service might offer a power console enabling the user to set specific power states or operational states of various components, such as by turning virtual knobs for the power states of those components. As discussed above, the customer can perform actions such as to adjust the operational states or idle states of one or more processors, power down and/or hot swap memory, spin down one or more disks, adjust an operational/suspend state of one or more peripheral devices, and the like. A user not wanting to use such a component, or at least not wanting to have that component in a standby or low power mode, can also potentially power down that component for at least a period of time. Due to the amount of power needed to bring a component back to a full operational state, however, there might be restrictions on power cycling various components. In some embodiments there might be limits on the types of adjustment and/or amount of adjustment that a customer can make to various components, as may also vary by the type of customer, type of resource, amount paid for the access, and other such factors. The customer control can be provided at any appropriate location, such as at the domU or other such layers.

The power management service can keep track of the operational state of any such component at different times when utilized by, or allocated to, a customer. An amount of power consumption can be determined for each state, which then can be used to determine an overall amount of power consumption for the customer. This information can be provided to the customer, used to bill the customer, used to meet regulatory requirements, or for other such purposes.

A power management service also might provide other types of customer control within the scope of the various embodiments. For example, the power management service might provide a customer with a predicted amount of power usage for the customer, based on past customer behavior, customer usage trends, and the like. The power management service might allow a user to specify a maximum amount of power usage over a period of time, as may be based at least in part upon the predicted amount of power consumption. For example, the user might set the limit at the average amount of consumption, a factor such as 1.2× the average consumption, etc. In some embodiments, the customer might look at the variations in power consumption for different periods and set the maximum such that adequate power will be provided for most periods, with only extreme usage cases being throttled or otherwise affected. Various other settings or values can be utilized as well. Further, in at least some situations a user might set specific maximum power values for specific components. For example, one customer might be interested in performance for a CPU, but less interested in performance for a disk drive, solid state drive, or GPU. In such cases, the customer might look to typical power usage values for at least some of these components and specify maximum values for those individual components. Alternatively, the user might submit an option such as "optimize for processing speed" or "optimize for throughput," which might also be submitted with an overall power maximum, and the system can determine which components to adjust or throttle in certain situations. In some embodiments, the customer can instead put a limit on the amount of carbon footprint, which can give the power management system an optional ability to select power from different sources, or perform operations at different times, where the power consumption will be the same but the carbon footprint per unit of power will be lower.

Figure 4:
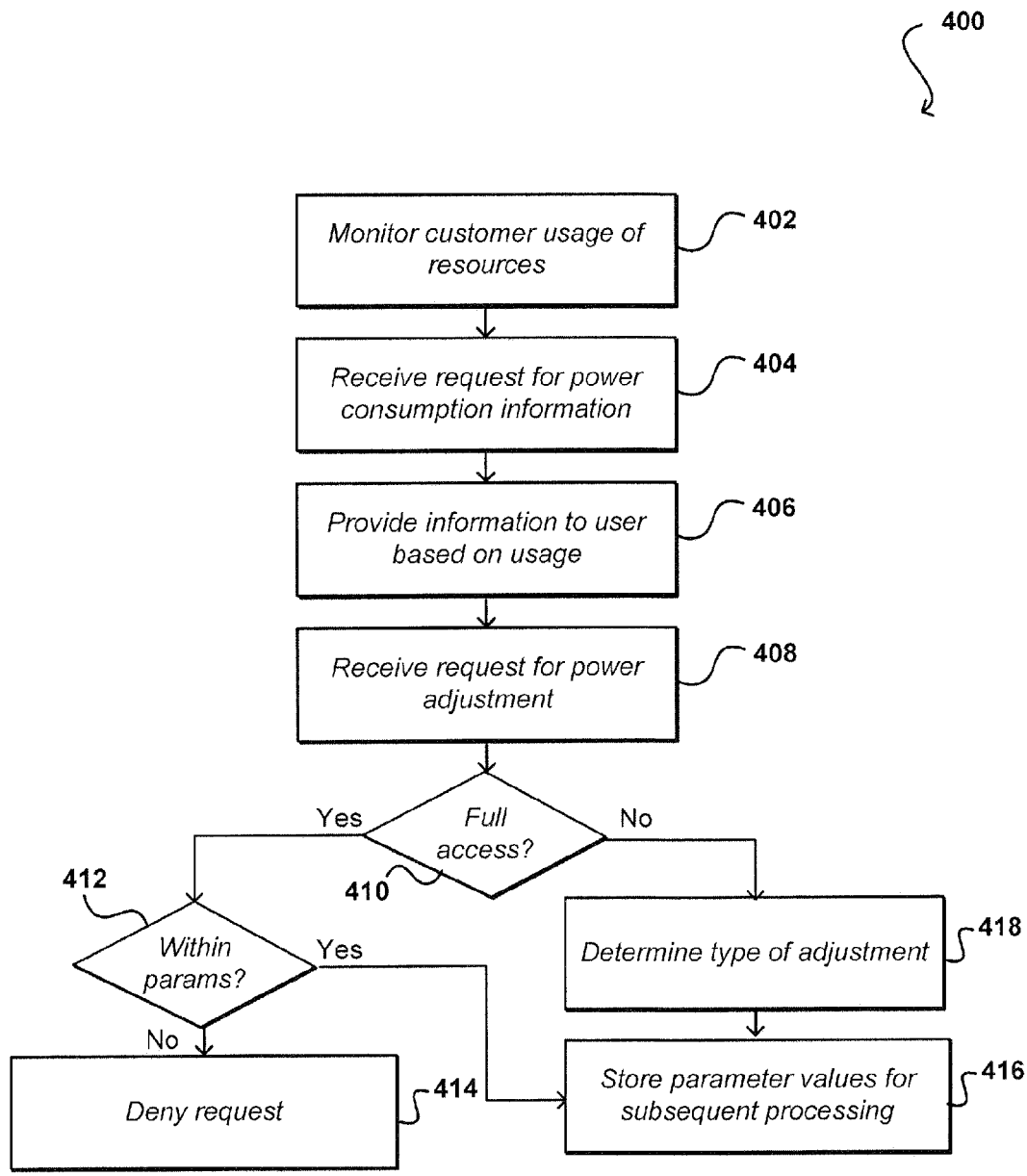
FIG. 4 illustrates an example of a process for enabling a customer to view and manage power consumption that can be used in accordance with various embodiments.

FIG. 4 illustrates an example process 400 for enabling a customer to view and/or manage power consumption that can be used in accordance with various embodiments. It should be understood that, for this and other processes discussed herein, that there can be additional, fewer, or alternative steps, performed in similar or alternative orders, or in parallel, within the scope of the various embodiments unless otherwise stated. In this example, customer usage of a set of resources and/or components is monitored 402 in an electronic environment. A request for power consumption information might be received 404 from a user, in response to which the monitored power consumption information can be provided 406 to the customer. As discussed, the power consumption information can be broken down by component, task, period of time, or other such information. The customer, after viewing the information or otherwise, might decide to adjust an aspect of the power consumption for one or more resources. A request might be received 408 from the customer asking to adjust the power consumption for that customer. A determination can be made 410 as to whether the customer has full access to, or at least some control over, the resource(s) and/or component(s) associated with the request. If so, a determination can be made 412 as to whether the requested change falls within allowable parameters for the resource(s) and/or component(s). If not, the request can be denied 414, or the customer can at least be informed that the requested adjustment is not able to be provided. If the request does fall within the allowable parameters, the parameter values can be stored 416 for future work performed for the customer. If the user does not have full access, or equivalent access, a determination can be made 418 as to the type of adjustment to be made. For example, the customer might request to optimize for power or reduce power levels of one or more components. A determination of an appropriate way to implement the request is determined, and the appropriate parameter values can be stored 416 for future work performed for the customer. Various other approaches can be used as well within the scope of the various embodiments.

The ability to optimize power consumption using such an approach, however, can depend at least in part upon whether there are other users sharing a resource. For example, there can be multiple instances provisioned on a host machine that might utilize the same CPU, RAM, storage drives (e.g., with different partitions), peripheral devices, or other such components. Further, there might be some components where multiplexing is utilized. For example, a host machine might have a single network interface card (NIC). The cloud manager might have the NIC configured for multiplexing of management traffic and traffic for the customer, as well as traffic for any other customer provisioned on the host. In such a case, the ability of the customer to place the NIC in a low power state can be limited at least in part by the needs of the cloud manager and/or other customers. For example, the power management service may need to reconcile the aggregate requirements for a given resource against the individual requests of customers, so customer requests may not always be satisfied even if the underlying resource is capable of satisfying the customer's request when used in a non-virtualized or otherwise dedicated fashion.

In at least some embodiments, a component such as the NIC can be able to switch power states for different customers or types of traffic, etc. In order to provide an appropriate accounting, however, a hardware mechanism might be needed in at least some embodiments where the information is not made available to software, such as where a hypervisor component is not running on a CPU at the same time as a guest OS of a customer. In at least some embodiments, a shared component can determine which customer is active during which times, and can provide a reporting about the customer and the state and/or power consumption during that time. Such an approach enables the changing of one or more power states, while providing an accurate accounting of the power consumption per customer. In at least some embodiments, the NIC can receive an identifier (ID) associated with a customer, such as an ID associated with a virtual machine (VM) of the customer, such that the NIC can know which customer is using the NIC for the next period of time. The information about the customer can be stored by the cloud manager, the power management service, the NIC, or any other appropriate location. In some embodiments, the power management service can know that traffic for a particular customer is currently using the NIC, and can know the power state of the NIC for that customer, such that the power management service can determine the amount of power consumption for the customer (based at least in part upon the power management service knowing a rate of power consumption for that component in that state).

For a device such as a CPU, where multiple users might have instructions processed by the processor at different times, portions of the processing time or "time slices" can be allocated to various customers. Certain CPUs can determine the amount of power used by that processor over a period of time. A CPU might receive a request with a VM_ID, and can track the amount of power consumption attributable to that VM_ID. In other embodiments, a CPU can know the VM context in which it is currently running. The processor can then expose (e.g., to the hypervisor) power consumption information by VM_ID, which can be used by the power management service to attribute that power consumption to the relevant customer. In some embodiments, a CPU might include a counter of power consumption that resets with each new VM_ID received. The CPU can know when it is processing instructions in a particular state for a particular customer, and knows when it is cycling through different operational states and idle states in response to a particular VM instruction. The CPU can account for this information internally. A hypervisor or other virtual memory manager can potentially read this information on a regular basis, or at designated times, using interrupts or other appropriate mechanisms. The processor in some embodiments can track the number of Watts used over a period of time, and report or expose that information by VM_ID for a particular time slice.

For a component such as RAM or a solid state drive, the amount of power for at least some of these components can be considered to be fixed, such that the amount of power consumption can be calculated even if the component itself does not assist in the accounting. In some instances, a customer can down-clock or down-voltage a solid state device, in order to draw substantially less power per unit time. In some situations, however, a cloud manager might offer the ability for customer "ballooning" RAM, where a customer can potentially obtain a capacity commitment beyond an amount dedicated for that VM. Accordingly, a dynamic calculation might need to be performed to account for actual usage at any given time. For example, between time point 0 and 10, the customer might use RAM amount N clocked at full voltage. Between time point 10 and time point 20, the customer might use RAM amount (N+M) (obtained via "ballooning") clocked at a lower voltage (and thus performance). The system can perform dynamic calculations across the total time period to determine total power usage.

A hardware accounting mechanism can be implemented in various other types of components as well. For example, a hard drive might receive an I/O request with a VM_ID. In addition to the read or write time, the drive can also charge the VM with the time needed to swing the arm or otherwise locate the data position on the disk. A counter or other mechanism can log the time and/or type of activity, and if possible can calculate and log the amount of power consumption for each period of activity of each type, and then can provide that information for each respective VM_ID.

In some embodiments, mechanisms such as memory map registers or machine state registers (MSRs) can be used to enable per-VM performance counters that utilize units of power consumption. The CPU can know how much power consumption occurs at each of the operational states or idle states, for example, and can increment the per-VM performance counter with each unit of consumption for the appropriate VM. These counters in at least some embodiments include registers that can be read and zeroed by software, in order to provide the necessary consumption information for each VM.

Each time there is a VM context switch for the CPU, the registers can be read out and zeroed in order to apply the next counts to the new VM context. In embodiments with multiple counters, the CPU can instead switch to incrementing the appropriate register at a VM context switch. The counter can be updated at any appropriate time, such as at regular intervals, upon each unit or number of units of power consumption, etc. The counter also can be updated at each idle state, operational state, or other such transition. The counters can be updated with wattage information in some embodiments, which is computed for a VM using the current task and/or state of the processor, which can be written into an MSR and read by software for metering or other such purposes. The register thus can expose the wattage of the CPU over a period of time along with the ID of the VM associating with that wattage, such that an appropriate accounting can be performed. In embodiments with dynamic adjustments, a cloud manager or power management service can pull the data from the register and perform any calculations needed to adjust a power state of the CPU or other such aspect. The software reading the register could be in any appropriate location, such as in the dom0, in user mode code, in the dom0 kernel, in the hypervisor, etc. Once the data is obtained, the data can be treated like any other network monitoring data, and fed into a billing service, green service, power budget accounting service etc. As discussed, such hardware counters, registers, or other such mechanisms can be added to any appropriate components as well, such as RAM, peripherals, hard drives, solid state drives, and the like.

In some embodiments an agent can be used to provide accounting information to a component such as a power management service. The agent can be a software agent configured to execute within a client instance or on a host machine, for example, in order to expose the power usage and/or resource allocation usage to the power management service or another appropriate entity. In some embodiments, an agent can provide performance information to the dom0 or another appropriate component. In some embodiments, an alternative "agent" can effectively be implemented through guest VM (i.e., "domU") OS kernel modifications.

Figure 5:
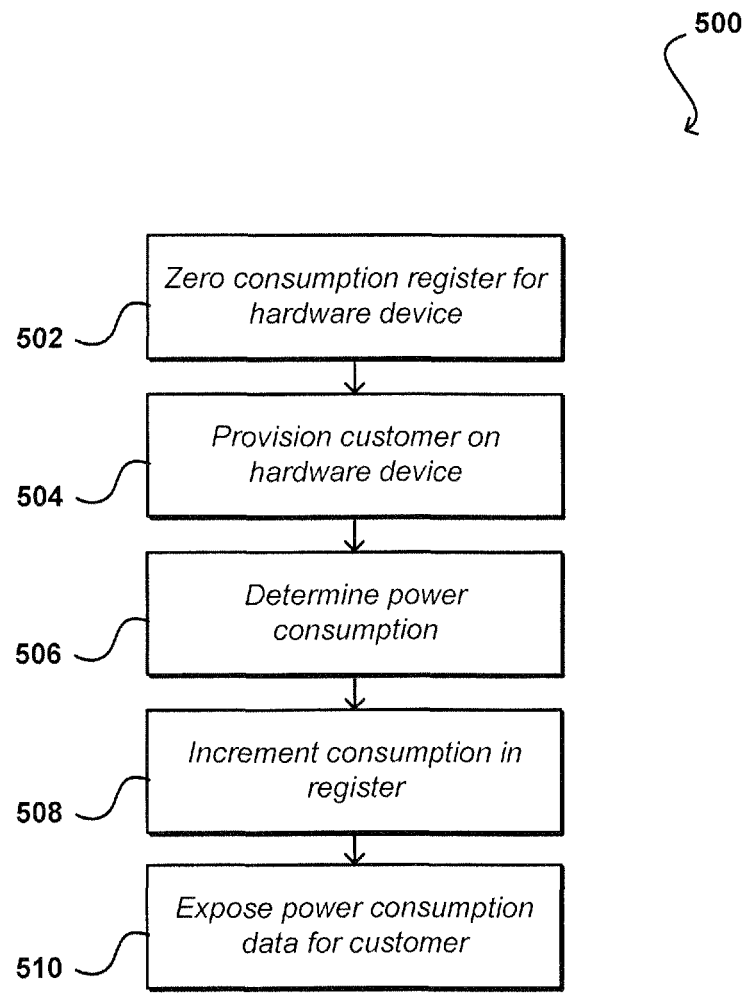
FIG. 5 illustrates an example of a process for obtaining user-specific power information from a hardware component that can be used in accordance with various embodiments.

FIG. 5 illustrates an example process 500 for obtaining power consumption information from a hardware device that can be utilized in accordance with various embodiments. In this example, a consumption register is zeroed 502 for a hardware device. The register can be assigned to a particular customer or VM, or a general register. The customer (or a VM for the customer, etc.) can be provisioned 504 on, or otherwise allocated usage of, the hardware device. While the customer is provisioned on the hardware device, the hardware device can determine 506 an amount of power consumption based at least in part upon a current state of the hardware device and/or the types of activities being performed. Power consumption 506 may be directly provided by the underlying hardware, or may be inferred from other information as described below. At one or more appropriate times, the consumption register is incremented 508 with the amount of power consumption since the last increment or other register event. The consumption register can be exposed 510 to software and/or hardware in order to provide an accounting of the actual power consumption of that resource that is attributable to the customer.

In some embodiments, software can attempt to infer an amount of power consumption. For example, a power management service can have information about rates of power consumption for particular activities, and can monitor customer traffic and allocations in order to determine an approximate amount of time that the customer performed each activity. Such an approach can at least provide a reasonable approximation of power consumption for the user.

As discussed, when changing a VM context on a resource or component, a counter, register, agent, or other such component can be updated in order to provide accounting for the new VM context. At or around the time of the context switch, however, a power management service and/or cloud manager component can cause information for the previous VM context to be stored such that when that VM context is again provisioned on that resource or component, the VM can obtain the same level of performance. For example, if a customer was using a high clock frequency state (e.g., "turbo-ing") before the transition, the customer might reasonably expect to resume turboing when provisioned back on the resource. The storing of VM context information related to power management settings can be performed in hardware and/or software in different embodiments. For example, the OS when performing the switching could dictate the appropriate power states, or the OS could give a component the appropriate VM_ID, which the component could use to determine the appropriate power state. Various other approaches can be used as well.

During context switching, such as when going between customers or VMs, there also will be some power consumption due to the switching. This can include storing information for the previous state, storing information for the new state, and actually switching the states. The overhead for the switch can be charged to either customer or both customers. For example, each customer might be charged the overhead for switching to the associated VM context, but not switching to the other VM context. Such an approach might not be fair, however, such as where the previous VM was running with very unusual parameters, providing for a significant context switching overhead. In some embodiments, the overhead for switching a new VM on can be split between the previous VM and the new VM. Various other allocation approaches can be used as well. Further, the overhead for other context switching can be charged to appropriate customers as well. For example, a processor can know how much power is consumed to go from one p-state transition to another. If the switch occurs during a particular VM context, the counter for that VM can be updated according to the amount of overhead for the transition. Such an approach might prevent a customer from frequently switching states to try to conserve power, where the power consumption associated with the switching might be on the order of the amount of power consumption saved.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for managing power consumption in a multi-tenant environment, comprising:
 monitoring usage of/computing components on behalf of a customer over a first period of time;
 determining an amount of power consumption attributable to the usage on behalf of the customer, the amount of power consumption being based at least in part upon at least one operational state of the one or more computing components during the usage;

providing the customer with information about the amount of power consumption;

enabling the customer to request a change in an operational state of at least one of the one or more computing components for usage on behalf of the customer over a second period of time, including enabling the customer to request to have limited power state control of at least one of the one or more computing components, the change in the operational state affecting the amount of power consumption over the second period of time;

receiving, by a power console interface configured to limit power state control of at least one of the one or more computing components in the multi-tenant environment, a request from the customer to change the operational state of at least one of the one or more computing components to a requested operational state; and in response to receiving the request from the customer to change the operational state of at least one of the one or more computing components to the requested operational state, updating one or more configuration parameters for usage of the one or more computing components on behalf of the customer when the change in operational state meets at least one allowable change criterion, the updating one or more configuration parameters causing the at least one of the one or more computing components to operate in the requested operational state when used for a subsequent task on behalf of the customer.

2. The computer-implemented method of claim 1, wherein the at least one allowable change criterion includes the customer having access to hardware supporting the one or more computing components.

3. The computer-implemented method of claim 1, wherein the at least one allowable change criterion includes at least one of the usage on behalf of the customer being able to meet at least one service guarantee with the change in the operational state or the change not adversely affecting another customer utilizing the at least one of the one or more computing components.

4. The computer-implemented method of claim 1, wherein the customer is enabled to request a change in an operational state using a Web service request submitted to an application programming interface (API) of a multi-tenant environment.

5. The computer-implemented method of claim 1, wherein the customer is enabled to view the information about the amount of power consumption using a service provided by a provider of the multi-tenant environment.

6. A computer-implemented method for managing power consumption in a multi-tenant environment, comprising:

receiving a request from a user to adjust an operational state of a computing component in the multi-tenant environment when the computing component is performing a task on behalf of the user, the operational state affecting a rate of power consumption of the computing component;

determining an amount of power consumption for performing a task, on behalf of the user, using the computing component in the operational state;

enabling the user to obtain information regarding the amount of power consumption for performing the task and enabling the user to have limited power state control of the computing component; and receiving, by a power console interface configured to limit power state control of the computing component in the multi-tenant environment, the request from the user to change the operational state of the computing component.

7. The computer-implemented method of claim 6, further comprising:

switching the computing component to the operational state before performing the task when the computing component is in a different operational state.

8. The computer-implemented method of claim 6, wherein the user has access to hardware for the computing component, the user enabled to adjust the operational state as desired during a period of the access.

9. The computer-implemented method of claim 6, wherein the request indicates a priority of one or more processing parameters affecting the rate of power consumption of the computing component, and wherein a management component of the multi-tenant environment determines the operational state for the computing component based at least in part upon the priority indicated by the customer of the one or more processing parameters.

10. The computer-implemented method of claim 9, wherein the one or more processing parameters include at least one of performance, throughput, latency, or power consumption.

11. The computer-implemented method of claim 9, wherein the rate of power consumption is controlled to ensure at least one of a maximum instantaneous power consumption rate or an amount of power consumption over a determined period of time.

12. The computer-implemented method of claim 6, further comprising:

determining whether the request to adjust the operational state of a computing component meets at least one operational criteria; and adjusting the operational state of the computing component when processing a task for the user customer to an extent allowable under the at least one operational criteria.

13. The computer-implemented method of claim 6, wherein the computing component includes at least one of a host machine, a virtual instance, a processor, memory, a physical storage device, or a network interface card.

14. The computer-implemented method of claim 6, wherein the operational state includes at least one of a power state, an operational state, an idle state, a clock speed, or an active state.

15. The computer-implemented method of claim 6, wherein determining the amount of power consumption for the computing component includes providing context about the user to the computing component for processing and requesting information from the computing component after completion of the processing.

16. The computer-implemented method of claim 6, wherein the request is received through an API of a Web services layer of the multi-tenant environment.

17. A computer-implemented method for providing information about power consumption in a multi-tenant environment, comprising:

receiving a first task to be performed on behalf of a first customer using a specified operational state for at least one computing component in the multi-tenant environment;

performing the first task using the at least one computing component;

determining an amount of power consumption attributable to the performing of the first task, the amount of power consumption being based at least in part upon a first operational state of the at least one computing component during the performing of the first task;

enabling the first customer to access information about the amount of power consumption and enabling the first customer to have limited power state control of at least one of the computing components; and receiving, by a power console interface configured to limit power state control of the at least one computing component in the multi-tenant environment, a request from the first customer to change the first operational state of the at least one computing component.

18. The computer-implemented method of claim 17, wherein determining an amount of power consumption includes contacting the at least one computing component for the amount of power consumption attributable to the first customer.

19. The computer-implemented method of claim 17, further comprising, in response to receiving the first task to be performed on behalf of the first customer:

determining a current operational state of the at least one computing component associated with a second customer;

storing information about the current operational state of the at least one computing component associated with the second customer; and setting the at least one computing component to the first operational state for use in performing the first task when the first operational state is different from the current operational state of the at least one computing component.

20. The computer-implemented method of claim 19, wherein an amount of power consumption for the at least one computing component is different when operating in the first operational state than when operating in the current second operational state.

21. The computer-implemented method of claim 19, wherein the stored information stored is capable of being used by the at least one computing component to adjust the first operational state of the at least one computing component when another task for the second customer is to be performed by the at least one computing component.

22. The computer-implemented method of claim 19, further comprising:

tracking an amount of power consumption by the at least one computing component attributable to each of the first and second customers, wherein the amount of power consumption includes power consumption experienced during a switch between the current operational state and the first operational state.

23. A system for managing power consumption in a multi-tenant environment, comprising:

at least one processor; and a memory device including instructions that, when executed by the at least one processor, cause the system to:

receive a request from a user to adjust an operational state of a computing component in the multi-tenant environment when the computing component is performing a task on behalf of the user, the operational state affecting a rate of power consumption of the computing component;

receive a task to be performed on behalf of the user using the computing component;

perform the task using the computing component in the operational state after any adjusting;

determine an amount of power consumption for performing the task using the computing component;

enable the user to obtain information regarding the amount of power consumption for performing the task and enable the user to have limited power state control of the computing component; and receive, by a power console interface configured to limit power state control of the computing component in the multi-tenant environment, the request from the user to change the operational state of the computing component.

24. The system of claim 23, wherein the instructions when executed further cause the system to:

switch the computing component to the operational state before performing the task when the computing component is in a different operational state.

25. The system of claim 23, wherein the computing component includes at least one of a host machine, a virtual instance, a processor, memory, a physical storage device, or a peripheral device, and wherein the operational state includes at least one of a power state, an operational state, an idle state, a clock speed, or an active state.

26. A non-transitory computer readable storage medium storing instructions for managing power consumption in a multi-tenant environment, the instructions when executed by at least one processor of a computing system causing the computing system to:

receive a request from a user to use a specified operational state for a computing component in the multi-tenant environment when the computing component is performing a task on behalf of the user, the specified operational state affecting a rate of power consumption of the computing component;

determine a task to be performed on behalf of the user using the computing component;

perform the task using the computing component in the specified operational state;

determine an amount of power consumption for performing the task using the computing component;

enable a user to have limited power state control of the computing component; and receive, by a power console interface configured to limit power state control of the computing component in the multi-tenant environment, the request from the user to change the specified operational state of the computing component.

27. The non-transitory computer readable storage medium of claim 26, wherein the instructions when executed further cause the at least one processor to:

enable the user to obtain information regarding the amount of power consumption for performing the task.

28. The non-transitory computer readable storage medium of claim 26, wherein the computing component includes at least one of a host machine, a virtual instance, a processor, memory, a physical storage device, or a peripheral device; and wherein the specified operational state includes at least one of a power state, an operational state, an idle state, a clock speed, or an active state.

* * * * *